United States Patent [19]
Johnson, Jr. et al.

[11] 3,825,751
[45] July 23, 1974

[54] METHOD AND APPARATUS FOR AERIAL RADIOACTIVITY SURVEYING FOR SURFACE MINERAL DEPOSITS WHICH COMPENSATES FOR THE RADIOACTIVE DECAY PRODUCTS IN THE ATMOSPHERE OF THE EARTH

[75] Inventors: Claiborne H. Johnson, Jr.; Robert S. Foote, both of Dallas, Tex.

[73] Assignee: Texas Instruments Incorporated, Dallas, Tex.

[22] Filed: Oct. 3, 1969

[21] Appl. No.: 13,917

[52] U.S. Cl............... 250/253, 250/255, 250/361
[51] Int. Cl............................................. G01v 5/00
[58] Field of Search ............ 250/83.6 S, 71.3, 83.6, 250/83.3

[56] References Cited
UNITED STATES PATENTS

| | | | |
|---|---|---|---|
| 2,836,726 | 5/1958 | Rich | 250/83.6 S |
| 2,897,368 | 7/1959 | Lundberg et al. | 250/83.6 S UX |
| 2,904,691 | 9/1959 | Mulligan | 250/83.6 S |

*Primary Examiner*—Archie R. Borchelt
*Attorney, Agent, or Firm*—Harold Levine; Rene E. Grossman

[57] ABSTRACT

An airborne gamma ray detection system is flown over the surface of the earth at a predetermined height. The energy spectrum of gamma radiation from the surface of the earth is detected and recorded at locations spaced along the travel path of the system. The gamma radiation emanating from uranium decay products borne by the atmosphere of the earth is also sensed and recorded with sufficient regularity to detect naturally occurring variations therein. The gamma radiation data detected from the surface of the earth is then corrected in order to reduce the inaccuracies created by the gamma radiation sources present in the atmosphere.

12 Claims, 8 Drawing Figures

INVENTORS:
CLAIBORNE H. JOHNSON
ROBERT S. FOOTE

INVENTORS:
CLAIBORNE H. JOHNSON
ROBERT S. FOOTE

INVENTORS:
CLAIBORNE H. JOHNSON
ROBERT S. FOOTE

INVENTORS:
CLAIBORNE H. JOHNSON
ROBERT S. FOOTE

METHOD AND APPARATUS FOR AERIAL RADIOACTIVITY SURVEYING FOR SURFACE MINERAL DEPOSITS WHICH COMPENSATES FOR THE RADIOACTIVE DECAY PRODUCTS IN THE ATMOSPHERE OF THE EARTH

This application relates to geophysical prospecting, and more particularly to aerial gamma radiation surveying for mineral deposits.

It has long been known that natural materials are gamma radioactive as a result of the distribution of uranium and thorium daughter products and potassium-40. Of course, the abundance of the radioactive materials in particular soils and rocks varies with the lithology, geologic age and mineralization history of the particular material. Uranium is normally present in its equilibrium abundance, as measured by its gamma ray emitting daughter product $Bi^{214}$, in regions where leaching, hydrothermal action and other disturbances have not allowed the removal of the gamma ray emitting fractions from the parent material. Thorium is found in equilibrium abundance with its daughter products because of its very short time period of decay from the parent $Th^{232}$ to $Pb^{204}$. Potassium-40 is generally present as .012 percent of natural potassium.

It is well known that the presence of these radioactive materials in subsurface regions may often be detected by measurement of surface radiation. Thus, measurements of the gross intensity of emitted gamma radiation has been heretofore utilized to detect high-magnitude anomalies caused by outcrops containing enrichment of uranium and thorium materials. Gross count gamma radiation detection has also been employed in aerial exploration for mineral deposits. Examples of such prior aerial detection techniques are disclosed in U.S. Pat. No. 2,904,691, issued on Sept. 15, 1959 to Mulligan and U.S. Pat. No. 2,986,638, issued on May 30, 1961 to Lee. However, such prior measurements of gamma ray gross intensity does not distinguish between the three emitting materials uranium, thorium and potassium-40. Such methods are thus of limited value in regions where low levels of anomalous radiation are significant through association with particular minerals and the like. It has not been unusual for unnecessary time and expense to be expended as a result of field parties being sent out to investigate an anomaly indicated by prior gross count techniques, but which was caused only by an outcrop of potassic granite or the like.

Systems have thus been developed for separation of uranium, thorium and potassium gamma ray emitting materials through the use of gamma ray spectroscopes which enables the detection of the energy spectrum of gamma ray emission. It has been found that uranium, thorium and potassium each emit radiation that falls within discrete and separated energy "windows" in the energy spectrum. For instance, potassium-40 has a single well-defined energy peak at about 1.46 mev. Thallium 208 of the thorium series emits energy having a peak at about 2.62 mev, while $Bi^{214}$ of the uranium series emits radiation having a peak at about 1.76 mev. Examples of airborne mineral prospecting systems utilizing gamma ray spectrometry are disclosed in the articles "Radiometric Exploration" by Roger Pemberton, Mining in Canada, May 1968; and "Airborne Gamma Ray Spectrometry" by D. B. Tipper, Australian Mining, Apr. 15, 1969.

With the use of aerial gamma ray spectrometry equipment, it has been found necessary to correct the detected gamma ray energy spectra for extraneous factors such as onboard background radiation, altitude variations and variations in climatic conditions. Recently, it has also been discovered that inaccuracies are introduced into aerial gamma ray spectrometry results due to the presence of airborne uranium decay products. Certain of these uranium decay products have a sufficiently long decay life in order to escape from the earth's surface and to randomly float through the earth's atmosphere in a widely distributed manner. In particular, $Bi^{214}$ is often present in the atmosphere of surveyed locations in sufficiently large quantities to severely affect the survey results.

It has thus been heretofore proposed to measure the amount of uranium decay products in the atmosphere during survey operations and to subtract this measurement from the survey results. However, previous techniques for accomplishing correction for atmospheric radiation have not sensed the atmospheric radiation with sufficient spatial resolution to follow naturally occurring variations in the atmospheric radiation. Thus, such previous attempts have not resulted in a practical technique for accurate elimination of errors in airborne gamma ray prospecting caused by gamma radiation emanating from sources in the atmosphere.

In accordance with the present invention, a technique of prospecting for mineral deposits is provided wherein the energy spectrum of gamma radiation from the surface of the earth is sensed. The amount of uranium decay products in the atmosphere of the earth is also sensed with sufficient spatial resolution to determine naturally occurring variations in the amount of uranium decay products within the atmosphere. The sensed energy spectrum of the gamma radiation from the surface of the earth is then corrected to reduce inaccuracies created by the uranium decay products borne in the atmosphere.

In a more specific aspect of the invention, a survey path is traversed over the surface of the earth at a predetermined height. At periodic locations along the survey path, the energy spectrum of gamma radiation from the surface of the earth is detected and recorded. Also at locations along the survey path, the gamma radiation exclusively emanating from the atmosphere above the predetermined height is measured and recorded. The measurements of the gamma radiation in the atmosphere is conducted with sufficient regularity to detect naturally occurring variations in the amount of gamma radiation sources present in the atmosphere. The detected energy spectrum of gamma radiation from the surface of the earth is then corrected to reduce the effect of the atmospheric borne sources of gamma radiation.

In accordance with additional specific aspects of the invention, a first set of thallium-activated sodium iodide crystals connected in parallel are mounted in an aircraft and are transported along an aerial survey traverse for measurement of gamma radiation from the earth. A second set of thallium-activated sodium iodide crystals are mounted on structure which excludes gamma radiation emanating from the surface of the earth, such that only gamma radiation emanating from the atmosphere is sensed thereby. Circuitry is provided to record the outputs of the crystals in a multiplexed digital format, wherein the data may be corrected and plotted in a contour map display.

For a more complete understanding of the present invention and for further objects and advantages thereof, reference is now made to the following description taken in conjunction with the accompanying drawings, in which.

Figure 1:
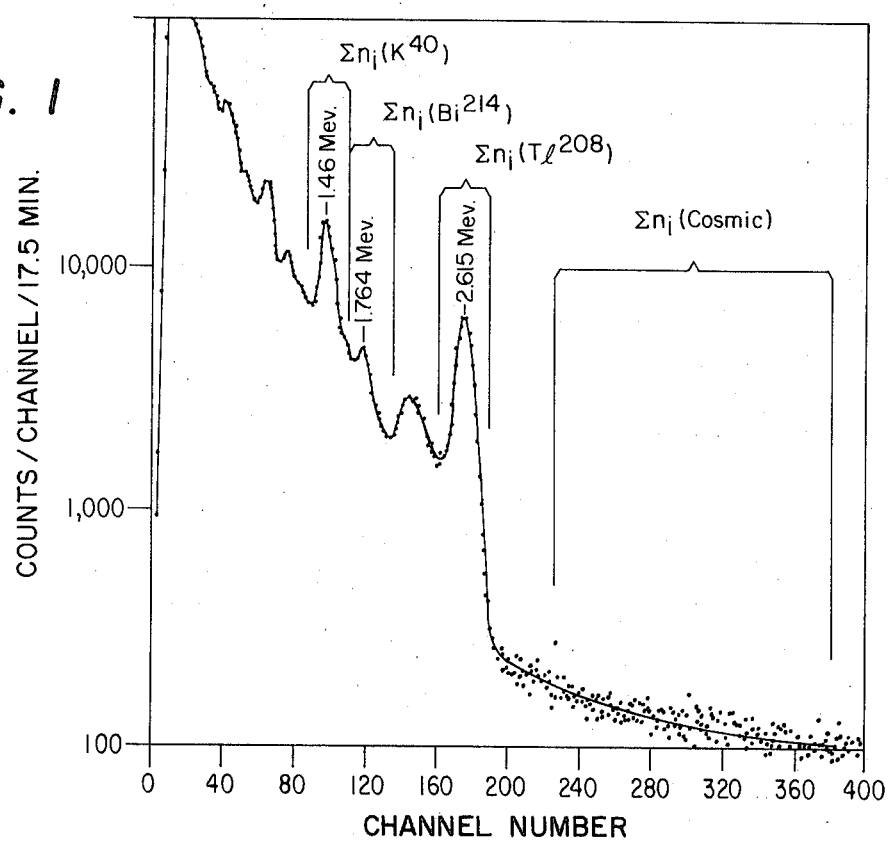
FIG. 1 is a graph of a typical gamma ray spectrum illustrating the energy summation intervals.

Referring to FIG. 1, a typical gamma ray energy spectrum is illustrated. Such a spectrum is typical of one produced by an airborne gamma radiation spectrometer wherein several hundred 2 second spectra are summed over a total time accumulation of 17.5 minutes. A suitable analyzer has assigned the amplitude of the pulse from a given detected gamma ray into one of possible 400 channel pulse height channel levels. Examination of the graph illustrates that cosmic gamma radiation has a much higher energy than the remainder of gamma radiation, and thus cosmic gama radiation may be easily discriminated against and eliminated from the detection results of an airborne radioactivity sensing system.

The count peak occuring at 2.615 mev may be seen from the graph to be indicative of the presence of thorium. The count peak existing at 1.764 mev indicates the presence of $Bi^{214}$ rays, while the peak at 1.46 mev indicates the presence of $K^{40}$. The presence of uranium may generally be inferred by the detection of the bismuth peak at 1.764 mev, subject to the problems created by atmospheric-borne $Bi^{214}$, as will be later described. Between the individual count peaks of each series, gamma rays of intermediate energy are found due to energy degradation through scattering and other phenomena to form a "Compton Continuum." The illustrated spectrum was attained from a height at about 400 feet. Spectrums attained from lower elevations would be quite similar but with higher amplitude.

Each of the energy groups illustrated in FIG. 1 contains counts of some cosmic energy, plus counts from at least one other isotope. For instance, it has been found that thorium and uranium created radiation tend to modulate somewhat the potassium-40 radiation energy group, as well as modulating each other. Additionally, cosmic radiation modulates each of the potassium-40, uranium and thorium created radiation. The interrelationships between the count groups may be accurately separated through data processing, wherein accurate energy calibration is performed on all the spectra prior to data reduction by matrix algebra, least square techniques or the like.

Figure 2:
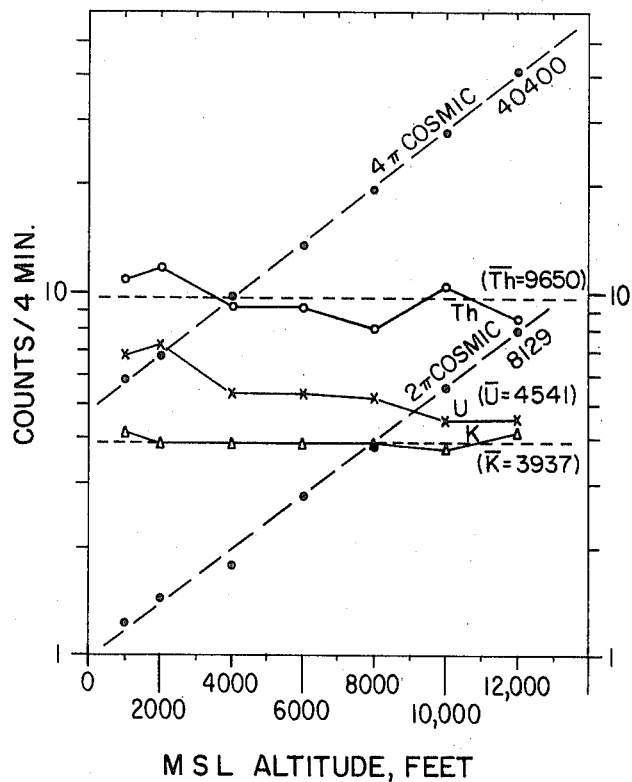
FIG. 2 is a graph illustrating a typical radiation altitude profile.

The gamma radiation spectrum shown in FIG. 1 is composed of radiation from a number of environments including radiation from the earth's surface, cosmic radiation, radiation from the aircraft carrying the system, and gamma radiation from particles carried by the atmosphere. FIG. 2 shows the result of data reduction as a function of mean sea-level altitude for data obtained by flying over a large fresh water lake. Thus, no surface gamma radiation was present during the survey. The accuracy of data reduction according to the invention is indicated by the generally constant intensity of thorium and potassium at all altitudes, while the relative intensity of the cosmic spectrum becomes very large. The curve identified as $4\pi$ cosmic was detected by a system responsive to the total cosmic radiation count, while the curve identified as $2\pi$ cosmic was detected by a system responsive only to atmospheric radiation. Such measurements are of assistance in determining the onboard background gamma radiation level. The count of uranium, as evidenced by the count of $Bi^{214}$, is illustrated as decreasing as a function of altitude. The reason for this decrease is the presence of a higher concentration of airborne gamma radiation sources near the surface.

In practice, results of measurements of thorium and potassium-40 along a flight line of about 30 miles in length have been reproduced upon reflight of the same path with an error of a few percent. However, the reproducibility of measurements of $Bi^{214}$ has been found to be far more complicated because of the relatively long radon decay half life of about 3.8 days. Soil material breathes radon into the atmosphere at a variable rate. The half life of radon allows it and its daughter products normally to extend to altitudes in the range of 20,000 feet. However, meteorological conditions such as temperature and soil water saturation may provide a highly variable near surface concentration of atmospheric radon which may vary substantially during 1 day's surveying operations.

Figure 3:
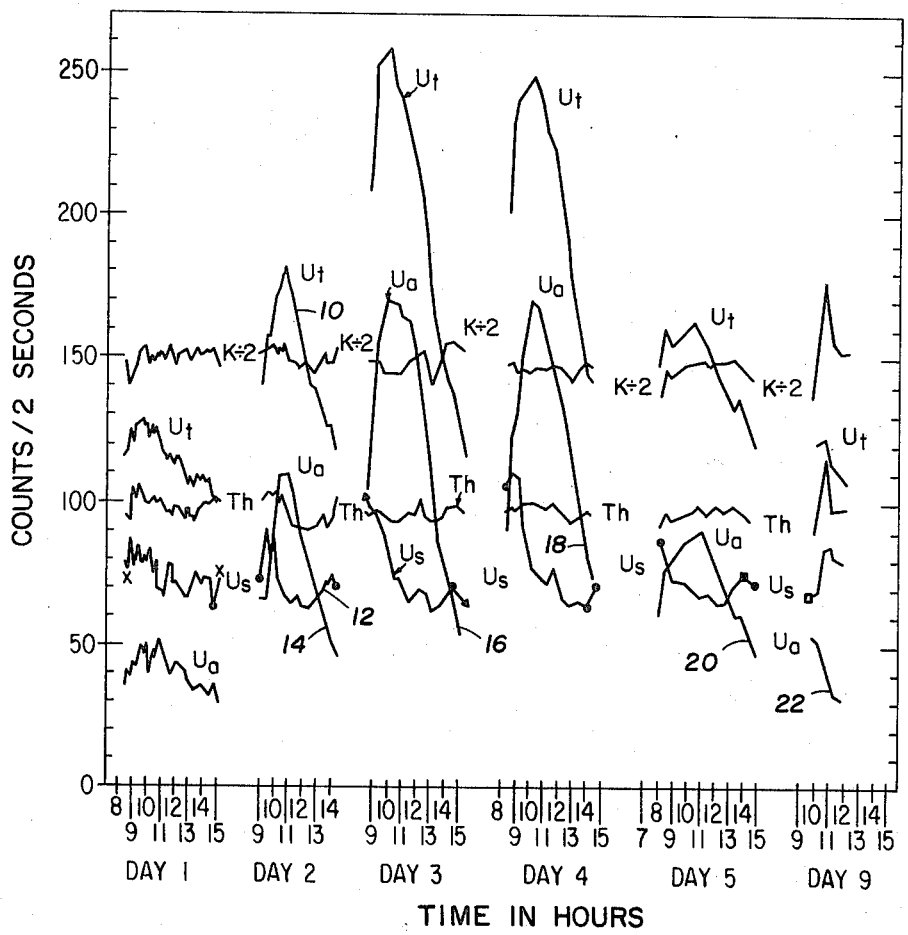
FIG. 3 is a graph illustrating average radiation data obtained as a function of time.

FIG. 3 is a graph of actual flights during 6 days which illustrate the wide variance of atmospheric radiation from day to day over adjacent flight paths. The graph illustrates 6 days each broken into approximately 6 hours of flying time, with curves identified as $K \div 2$ being provided to indicate the counts received for potassium-40. The counts for potassium have been reduced by a factor of two to properly fit the counts upon the present graph. Additionally, the graph illustrates the counts for thorium during each day with curves identified by Th. The total counts for uranium, as evidenced by the total count for $bi^{214}$, are indicated by curves $U_t$. Each total count $U_t$ for uranium products has been broken down according to the invention into radiation emanating from the surface of the earth which is identified as $U_s$ and into gamma radiation emanating from the atmosphere which is identified as $U_a$.

Referring to FIG. 3 during Day 1, it will be seen that the energy levels for potassium, thorium and the total uranium radiation do not widely vary over the flight path of approximately 30 miles. In fact, referring to the remaining 5 days illustrated on the graph, it will be seen that the potassium and thorium counts remain relatively constant during each of the flights. However, it will be seen that the total uranium count $U_t$ varied widely from the succeeding survey days. As an example, the total uranium count $U_t$ identified as 10 which was detected in Day 2 is much higher than the count on the preceding day. The surface count $U_s$ identified by numeral 12 may be seen to be quite similar to the surface count made on Day 1, but the count of gamma radiation emanating from the atmosphere $U_a$ and identified as 14 is seen to have sharply increased.

The increase of the atmospheric radiation $U_a$ may thus be seen to be essentially the sole cause for the sharp rise in total uranium count. Similar and even more striking results occurred on Day 3 and Day 4, wherein the total uranium count $U_t$ may be seen to have almost doubled from the count of Day 1. Again, this sharp increase in total uranium count $U_t$ was caused by a sharp increase in the atmospheric count $U_a$ identified as curves 16 and 18. Referring to Day 5 and Day 9, the count from the atmosphere $U_a$, as illustrated by curves 20 and 22, has decreased sharply to bring the total uranium count $U_t$ back down to essentially the original level measured in Day 1.

FIG. 3 thus very clearly illustrates that substantial inaccuracies may be introduced into surface radiation counts if the radiation emanating from the atmosphere is not taken into account. It should be noted that the data shown in FIG. 3 for the surface count $U_s$ is subject to slight correction for the data which was gathered in the early morning prior to the rise of a near-surface temperature inversion layer. Such layers have been found to trap surface-emitted radon for a time. Reflight of the last flight line of a preceding day as the first line of the current day, and measurement of the magnitude of change of the atmosphere $Bi^{214}$, often allows a close estimate of this inversion layer trapped $Bi^{214}$ radiation to enable final careful correction of the surface radiation count.

Of interest is the fact that the atmospheric radiation shown in FIG. 3 varied widely from a relatively low early morning count to a high count in the middle of the day and back down to a lower count as the day progressed. Such naturally occurring variations are common and must be carefully measured during the entire flight at sufficiently close intervals to allow good definition of the variations. Merely an average count or estimation of the atmospheric radiation may be seen to produce rather gross inaccuracies in the final correction of the surface emitted radiation data.

Figure 4:
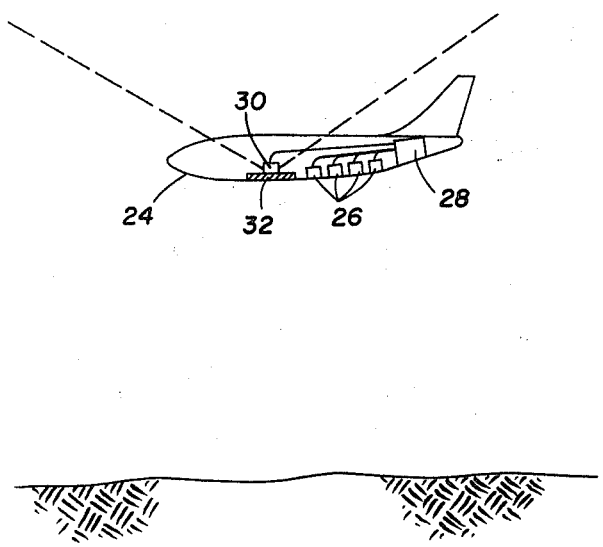
FIG. 4 is a diagrammatic illustration of a simplified embodiment of the invention.

FIG. 4 diagrammatically illustrates the airborne apparatus for accomplishing the present method. An aircraft 24, which may comprise any suitable craft including helicopters or the like, contains a plurality of gamma ray detectors 26 mounted therein. Detectors 26 generate electrical signals which are received, sorted, counted and recorded by a processing unit 28 to provide a gamma ray spectrum similar to that shown in FIG. 1, including a composite of cosmic radiation, background radiation, gamma radiation from the earth's surface, and gamma radiation emanating from particles carried by the atmosphere.

In order to enable correction for atmospheric radiation, the present invention utilizes one or more upwardly directed gamma ray detectors 30 mounted upon a radiation shield 32, such that only gamma radiation emanating from above the line of flight of the aircraft 24 will be received thereby. Shield 32 will preferably comprise a thick layer of lead or other material essentially impervious to gamma ray penetration. Detector 30 generates electrical signals representative of the gamma radiation from the atmosphere which is input into the processing unit 28 to enable correction of the gamma radiation from the earth's surface. Aircraft 24 in practice may fly generally at a constant height of about 400 feet above the earth's surface, although higher or lower flights may be made if desired.

Figure 5:
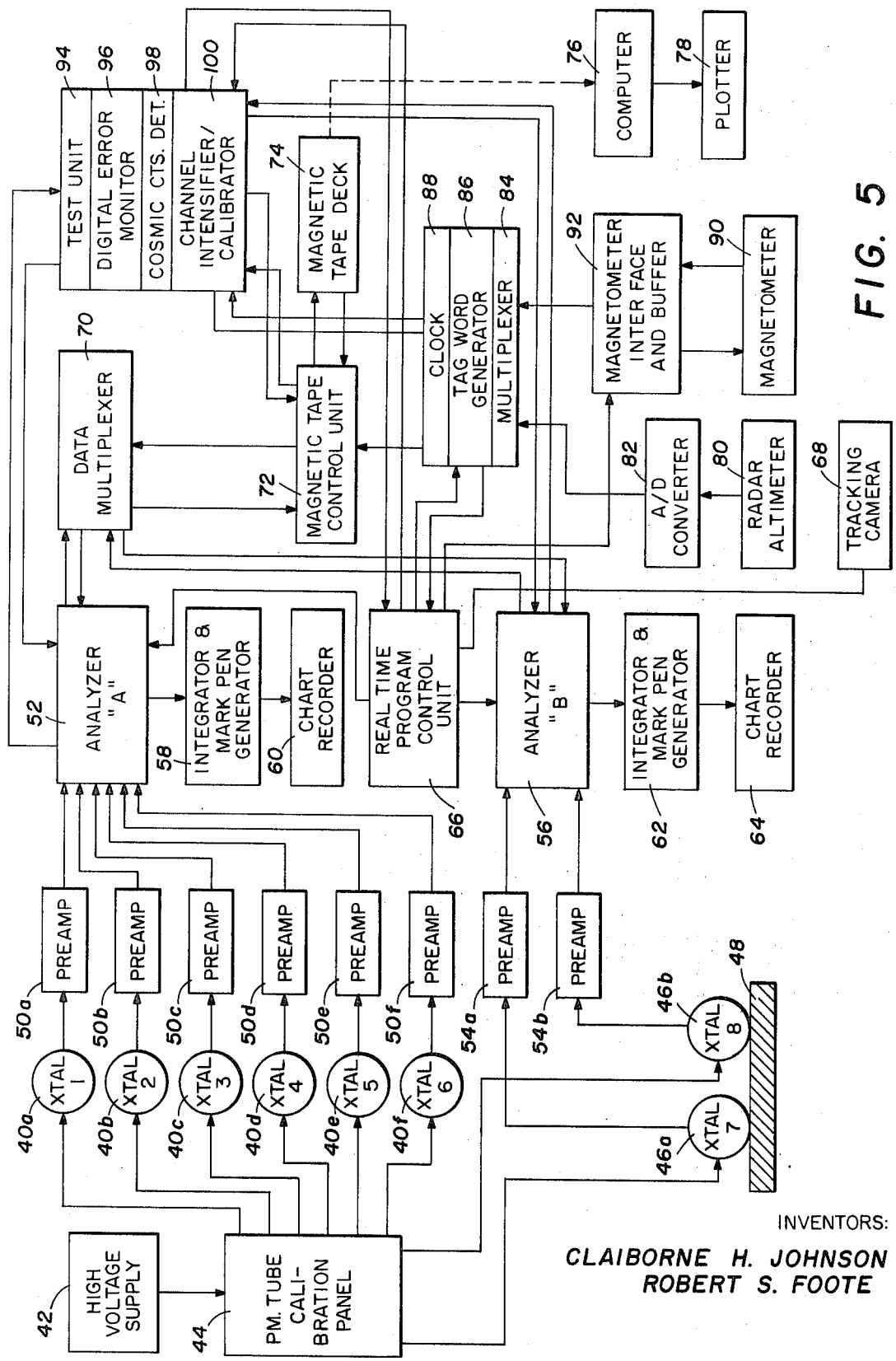
FIG. 5 is a block diagram of the preferred embodiment of the invention.

FIG. 5 illustrates a more detailed block diagram of the preferred embodiment of the invention. Six gamma ray detectors 40a–f are mounted in an aircraft and are disposed downwardly to sense primarily the radiation emanating from the surface of the earth. Preferably, these gamma detectors 40a–f comprise thallium-activated sodium iodide crystals. A high voltage supply 42, which in a practical embodiment will provide about 1,200 volts D.C., feeds voltage through a photomultiplier tube calibration panel 44 for energizing the gamma ray detectors 40a–f. The calibration panel contains variable resistors for adjusting the gain of each of the photomultipliers which sense the outputs of the crystals.

Two additional gamma ray detectors 46a and 46b are mounted upon a lead shielding plate 48, such that the crystals are able to detect only radiation emanating from the atmosphere above the line of flight. In practice, the lead shielding 48 comprises a lead plate approximately 3 inches thick and having a weight of over 1,300 pounds. Crystals 46a–b are supplied with calibrated voltage from the calibration panel 44.

It will be understood that while two crystals 46a and 46b have been illustrated in the preferred embodiment, a single upwardly looking shielded gamma ray detector may be utilized in place thereof if suitable adjustments are made in the counting interval, in the manner to be later described. Further, more than two detector crystals may in some instances be connected in parallel.

The outputs from crystals 40a–f are respectively fed into preamplifiers 50a–f, the outputs of which are fed into an "A" pulse height analyzer 52. Similarly, the outputs from crystals 46a and 46b are respectively fed into preamplifiers 54a and 54b, the outputs of which are applied to a second "B" pulse height analyzer 56. Analyzers 52 and 56 may comprise any suitable pulse height analyzer which categorizes pulses into a plurality of channels in dependence upon their height. In the preferred embodiment of the invention, each of the analyzers sorts pulses into selected ones of 400 channels. Suitable pulse height analyzers for use in the invention are the TMC 406R and TMC 404 pulse height analyzers which have been manufactured and sold by Technical Measurement Corporation.

The output from analyzer 52 is fed to a digital channel integrator and mark pen generator 58. The integrated output from generator 58 is used to drive a visual chart recorder 60 to provide a substantially real time indication of the data being accumulated. Similarly, the output of analyzer 56 is fed to a digital channel integrator and mark pen generator 62 which drives a visual chart recorder 64 in the same manner. Integrators 58 and 62 enable selection of any portion of either analyzer's memory for spectrum analysis purposes. The chart recorders 60 and 64 may comprise any suitable recorder, but in the preferred embodiment comprise Esterline/Angus stripchart recorders.

A real time program control unit 66 is provided for selected control of analyzer 52 or analyzer 56. Actuation of the control unit 66 enables the present system to operate in a real time mode if desired. When the control unit 66 is not actuated, the unit operates in the live time mode which includes the analyzer dead time. The output of the control unit 66 is utilized to control a tracking camera 68 which provides an accurate determination of the aircraft's position along a given flight line for each data set. The photographs taken by camera 68 are thus correlated with the navigators records for exact positions along the flight lines. A suitable camera for such purposes is the Neyhart Automax 35mm. Tracking Camera.

The outputs from each of the analyzers 52 and 56 are fed into a data multiplexer 70 so that the data of the system may be interleaved on a single recording channel. The output of the multiplexer 70 is fed to a magnetic tape control unit 72 which controls a conventional magnetic tape deck 74. The data multiplexer 70 is described in more detail in FIG. 6. The magnetic tape control unit 72 contains digital interface electronics and power supplies as necessary for automatic control of the functions of the system. A suitable control unit has been manufactured and sold by Technical Measurement Corporation. The magnetic tape deck 74 is suitable to record a seven-track IBM-compatible digital tape upon command. A suitable such tape deck has been manufactured and sold by Shepherd Industries.

Data accumulated during operation of the aerial system is stored in tape deck 74. After completion of survey flights, the data is transported to a suitable computer 76 wherein corrections according to the invention are made. The computer 76 then drives plotter 78 to output the data as required, as will be later described. Plotter 78 may be operated to provide contour flight maps illustrating the various intensities of selected minerals.

A radar altimeter 80 provides an exact indication of the elevation of the aircarft above the ground surface. This enables the pilot of the aircraft to hold an accurate altitude during flying of the survey lines. A suitable radar altimeter is manufactured and sold under the trade name LSE APN/141. The analog output of the altimeter is fed to an analog digital converter 82 which converts the altimeter data into digital form. The output of the converter 82 is fed to a multiplexer unit 84 which multiplexes the altimeter data with the data to be stored in the magnetic tape deck 74. A tag word generator 86 is provided to enable the multiplexing of desired tag words or legends onto the magnetic tape stored data. For instance, information regarding the flight line, date of the survey and the like may be input and stored on the magnetic tape deck 74. A clock 88 is provided to provide accurate control for the various operations, and in particular multiplexing operations, of the system.

A magnetometer 90 is provided to simultaneously make magnetic surveys of the ground surface to provide supplementary data for the present gamma ray survey. A suitable such magnetometer is the Varian 4937 Proton Magnetometer. The output of the magnetometer 90 is fed through a suitable magnetometer interface and buffer 92 which enables the proper incorporation of the outputs from the magnetometer 90 into the magnetic tape deck 74.

A system readout test unit 94 is interconnected with the analyzers 52 and 56, and the clock 88, in order to enable the monitoring of the digital data as it is being recorded, or after the data is played back into the memories of the analyzers. Additionally, a digital error monitor 96 is provided to indicate possible malfunctions for assistance in trouble-shooting of the system. A cosmic count detector 98 is also provided. A channel intensifier and calibrator 100 is provided in order to facilitate equalization of the gain of each of the detectors.

Figure 6:
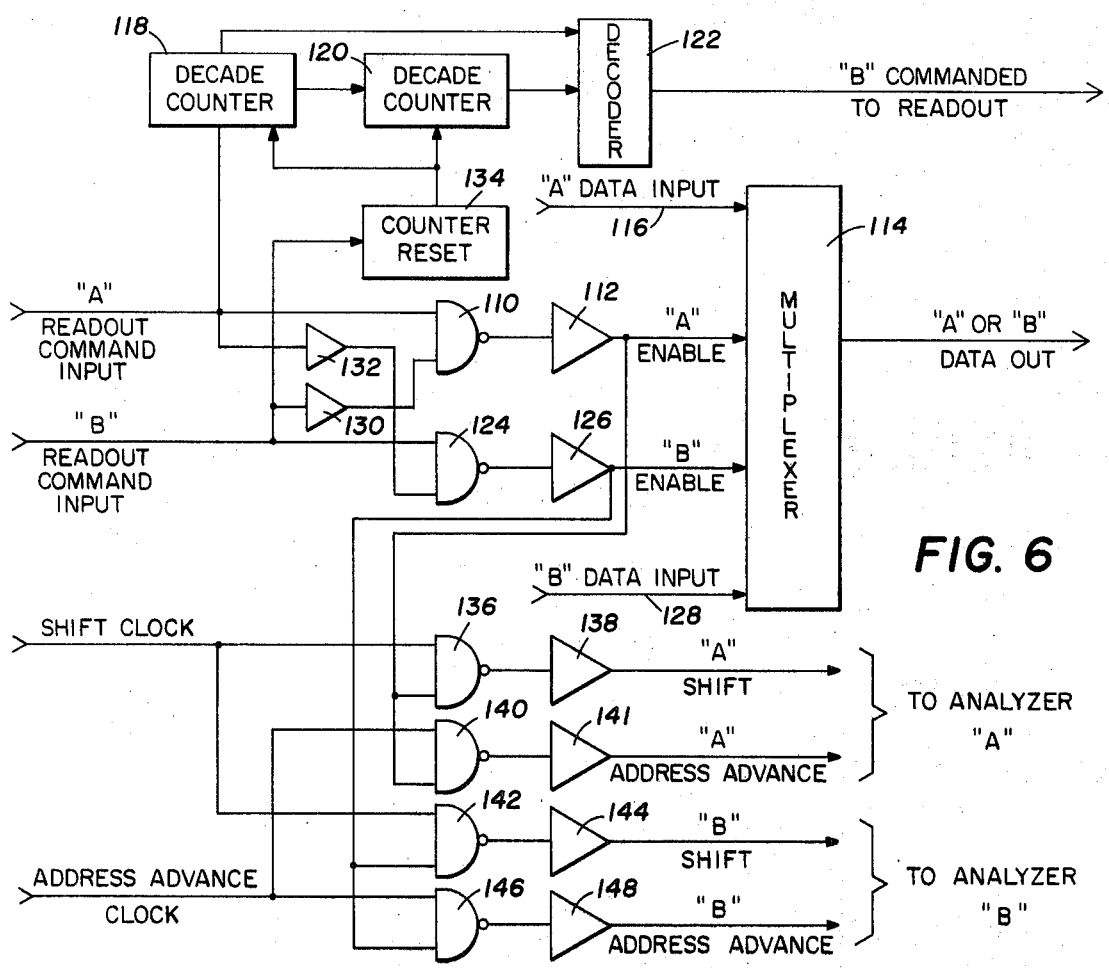
FIG. 6 is a block diagram of the multiplexer for use with the system of FIG. 5.

Referring to FIG. 6, a block diagram of the multiplexer 70 shown in FIG. 5 is illustrated. A readout command input is applied to a NAND gate 110, the output of which is fed through an invertor 112 which supplies an enable signal to a conventional digital multiplexer circuit 114. A data input from the "A" analyzer is applied to multiplexer 114 at 116. The "A" readout command input is also fed to a decade counter 118, the output of which is applied to a decade counter 120 and to a decoder circuit 122. A "B" command output is generated by the decoder 122 to command the "B" analyzer to read out after a selected number of "A" analyzer readouts. In an embodiment used in practice, "B" analyzer was commanded to read out after 40 "A" analyzer readouts.

A "B" readout command input is applied to an input of a NAND gate 124, the output of which is fed through inverter 126 to act as a "B" enable signal for multiplexer 114. The system thus ensures that both "A" and "B" readout channel inputs cannot simultaneously be applied to the multiplexer 114. A "B" analyzer data input 128 is applied to the multiplexer 114. The "B" readout command input is also applied via an inverter 130 to an input of NAND gate 110. The "A" readout command input is supplied via inverter 132 to an input of the NAND gate 124. The "B" readout command input is also applied to a counter reset 134 which controls the decade counter 118 and decade 120. The multiplexer 114 is thus controlled to read out either "A" or "B" analyzer data to the magnetic tape unit for recording.

An output from the shift clock is applied to an NAND gate 136, the output of which is applied through an inverter 138 to act as an "A" shift signal for application to analyzer "A." The "A" enable signal is also applied as another input to the NAND gate 136. The "A" enable signal is also applied as an input to a NAND gate 140. Another input is applied to gate 140 from an address advance clock. The output of gate 140 is applied through an inverter 141 to the analyzer "A" to act as an address advance signal. The "B" enable signal is applied to an input of a NAND gate 142, the output of which is applied through an inverter 144 to act as a "B" shift signal for application to analyzer "B."

The "B" enable signal is also applied as an input to a NAND gate 146, the output of which is applied through an inverter 148 to act as a "B" address advance signal for application to the analyzer "B." The address advance clock is applied at inputs to both gates 140 and 146. The shift clock access is input to gate 136 and to gate 142. Operation of the multiplexer circuit as illustrated will thus provide a multiplexed digital signal for recording upon the conventional magnetic tape unit. Tag word commands are additionally multiplexed by application to the tape in the manner previously noted.

After the data has been recorded on magnetic tape according to the invention, the data is fed into a suitable computer, usually positioned in a remote processing location. A typical surveying system according to the invention would record spectral data sequentially on 1/2 inch magnetic tape at a bit packing density of about 200 bits per inch. Each spectrum would thus require about 405 milliseconds to record 400 six-decimal-digit numbers plus five six-digit peripheral tag words. A fixed time of 0.5 seconds is thus allowed, which means that each 2-second spectrum consumes the total time of approximately 2.5 seconds.

In a typical 400 channel pulse height analyzer, energy calibration of the data places the 2.615 mev photopeak representing $Tl^{208}$ in channel 175. Channel count summation for $Tl^{208}$ is based on summation from channels 162–187. The $Bi^{214}$ count is based upon count summation from channels 110–161. The potassium-40 count summation covers the channel group 89 through 109. Information on cosmic intensities is based on count summation of channels 200 through 399. The measurement of total count may be made in the energy range 100 kev to 2.80 mev. Of course, with use of different pulse height analyzers having different channel numbers, different channel count summations will be utilized.

The field tape is then converted into binary high density data and re-recorded by an edit routine which also verifies the data to be good. Operations are then performed upon the data which normally adds a plurality of 2-second spectra, to smooth out statistical variations in the data so the spectrum is smooth enough to accurately locate the channel position of the $Tl^{208}$ Tl photopeak at 2.615 mev and the potassium-40 photopeak at 1.46 mev. The counts/channel for each spectrum are then corrected to match the exact gain used in obtaining the standard environmental spectra for each of the basic radiation sources. Corrections are then made to the energy gain shift to provide accurate reduction of the counts/channel group sum.

The data is then reduced by matrix reduction, which is equivalent to simultaneous equation solution, to give the total $Bi^{214}$, $Tl^{208}$, potassium-40 and cosmic count present for the channel group sum assigned to each material. The contribution from aircraft on board radiation is then eliminated.

An important aspect of the invention is the reduction of the atmospheric $Bi^{214}$. This is accomplished by multiplying the total atmospheric $Bi^{214}$ measured by the two upward looking detectors by a predetermined constant and then subtracting the atmospheric data from the data obtained from the six parallel downwardly looking detectors.

The gamma ray detectors used with the invention may comprise any suitable detector which provides the desired accuracy in detecting gamma ray energy level spectrums. However, as previously noted, the preferred detectors for use with the invention are large crystals of thallium-activated sodium iodide which scintillate upon absorption of gamma rays. The energy of the gamma ray is converted into a light flash which is detected and amplified by photomultiplier tubes disposed immediately adjacent the crystal. This electrical pulse provided by the photomultiplier tubes has an amplitude proportional to the energy of the incident gamma ray. Threshold mode operation may be utilized with such crystals to eliminate detection of nongamma cosmic radiation.

Such gamma ray detectors are presently commercially available, with exemplary types being the McPhar AV-4 Radiation Spectrometer or the detectors manufactured and sold by Harshaw Chemical Company. Such crystals are housed in fiberglas containers and are insulated to protect against thermal and mechanical shock. The six downwardly directed detectors shown in FIG. 5 are each provided with a thermal jacket and are securely fastened to the bottom of the aircraft.

Figure 7:
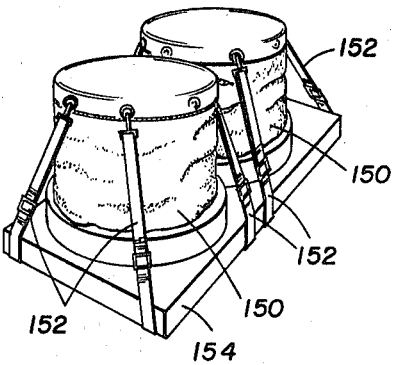
FIG. 7 is an illustration of the mounting structure of plural atmospheric gamma ray detectors according to the invention.

With respect to the upwardly facing detectors which are shielded from ground emitted radiation according to the invention, FIG. 7 illustrates a suitable technique for mounting the detectors within an aircraft. Each of the detectors is provided with a thermal jacket 150 which comprises an insulated canvas jacket. Restraining straps 152 are attached at the upper end of the jackets and are attached to the aircraft floor in order to firmly mount the crystals. The crystals are supported upon a thick lead plate 154 of a thickness of about 3 inches and which is bolted to the floor of the aircraft. In this position, the sodium iodide crystals detect only radiation emanating from above the flight path of the aircraft in the manner of the invention.

It is important that the detectors utilized for the invention be sufficiently large to permit total absorption of the incident gamma ray photons. A plurality of such detectors placed in parallel, with the preferred embodiment utilizing six such detectors in parallel, provides a spectra counting rate sufficiently intense to give good statistical measurements in a very short period of time to thereby accurately measure the surface distribution of uranium, thorium and potassium.

The range of energy which is characteristic of emission from the nucleus of uranium and thorium daughter products, and from potassium-40, is about 50 kev to 2.615 mev. Of course, cosmic radiation extends to higher energy levels. The present detector size is thus also set by performance criteria which gives the best total capture of energies up to the 2.615 mev line which is emitted from $Tl^{208}$, a $Th^{232}$ daughter.

For optimum results, it has been found that six identical thallium-activated sodium iodide detectors having diameters of about 11½ inches and thicknesses of about 4 inches provide the necessary counting rates over the energy spectrum necessary to allow statistically valuable 2-second data accumulation periods at the altitudes used for aerial surveying. Of course, other combinations of more or less detectors of varying sizes may be used to accomplish different desired operating characteristics.

The gamma ray detectors which are shielded in such a manner as to be responsive only to gamma radiation emanating from the atmosphere will generally be identical to the nonshielded detectors utilized. An extremely important aspect of the present invention is the sampling interval utilized for the shielded detectors. As previously noted, prior techniques used long counting intervals which gave only a gross approximation of the atmospheric radiation. The present invention envisions sensing the amount of uranium decay products in the atmosphere with sufficient spatial resolution to determine naturally occurring variations in the amount of such products. As noted in FIG. 3, such naturally occurring variations may be substantial over a small time interval along a flight path. In practice, it has been found that substantial naturally occurring variations in the amount of uranium decay products may occur over ranges as small as a few miles.

Therefore, the present invention utilizes a sampling interval for the atmospheric radiation detectors of substantially less than intervals of 30 miles. With detection intervals greater than about 30 miles, it has been found that severe inaccuracies may be introduced into the corrected data. In the preferred embodiment of the invention shown in FIG. 5 wherein two large shielded detectors are used, sampling intervals of not more than about 5 miles have provided optimum results, as such sampling has been able to closely follow naturally occurring spatial variations in the atmospheric-borne radiation sources. Of course, the time interval during such counting intervals will depend upon the speed of the aircraft involved. In some instances, three or more upwardly looking shielded detectors may be utilized to detect atmosphere radiation according to the invention.

Preferably, the surveying according to the invention is carried out along a number of relatively closely spaced parallel lines. In practice, spacing apart of such lines of about 1/2 mile to 1/4 mile provides good results. After the correction of the surface data according to the invention, the corrected data may be plotted as a graph. One method of graphical presentation is the stacking of profiles along the flight line, each of the profiles representing the magnitudes and ratios of uranium, thorium and potassium. Other profiles may illustrate the total count and the error introduced by atmospheric-born uranium decay products.

Figure 8:
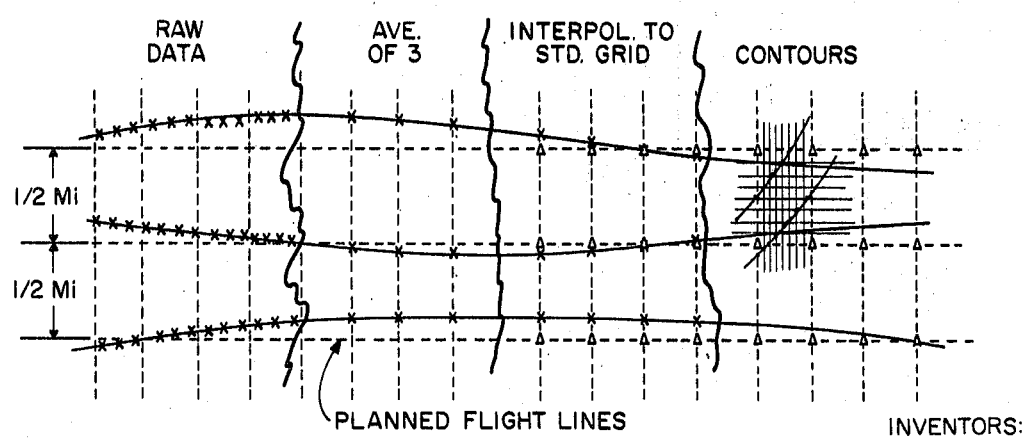
FIG. 8 is an illustration of a mapping technique utilizing the data provided by the present invention.

Detailed coverage of specific areas may be accomplished by arranging the flight paths according to a regular grid coverage in the manner shown in FIG. 8. The regular grid coverage is spaced with the parallel flight lines separated 1/2 mile or less. Isoradiation contouring best illustrates the output data. As shown in FIG. 8, the raw data is processed to provide a best average of several points relative to the planned flight lines. These points are then interpolated to a standard grid. In the final step, contour lines are provided to provide contour map information. As previously noted, in practice, a properly programmed digital computer is utilized to directly plot isoradiation maps with the various background and atmospheric radiation components eliminated to provide a true presentation of the desired surface radiation concentration.

The present invention thus provides a practical technique for accurately indicating deposits of potassium, thorium, uranium and other minerals by the use of airborne radioactivity surveying. The use of upwardly looking shielded detectors to determine atmospheric radiation enables accurate final data to be produced, which is not influenced by variations in the amount of uranium decay products in the atmosphere. Extremely important for practical surveying is that the frequency of counting of such atmospheric radiation provide sufficient spatial resolution to accurately determine naturally occurring variations in atmospheric radiation. The multiplexing according to the invention enables the use of high speed data processing, as by properly programmed digital computer, to provide automatic plotting of corrected data.

Whereas the present invention has been described with respect to several specific embodiments thereof, it will be understood that various changes and modifications will be suggested to one skilled in the art, and it is intended to encompass those changes and modifications as fall within the appended claims.

What is claimed is:

1. A method of prospecting for mineral deposits comprising:

sensing the energy spectrum of gamma radiation from the surface of the earth during an aerial traverse of said surface, sensing the amount of $Bi^{214}$ in the atmosphere of the earth with sufficient spatial resolution to determine naturally occurring variations therein, said spatial resolution being achieved by sensing at least once during each of a plurality of 5 mile intervals of said aerial traverse, and correcting the sensed energy spectrum of said gamma radiation to reduce inaccuracies created by the sensed $Bi^{214}$ borne in the atmosphere.

2. The method of claim 1 wherein the gamma radiation from the surface of the earth is excluded from the sensing of the amount of $Bi^{214}$ in the atmosphere.

3. The method of radioactivity aerial surveying comprising:

traversing a travel path over the surface of the earth at a predetermined height, detecting at locations along said travel path the energy spectrum of gamma radiation from the surface of the earth, measuring at locations along said travel path the gamma radiation emanating from $Bi^{214}$ in the atmosphere above said predetermined height while excluding measurement of gamma radiation emanating from below said predetermined height, such measurements being conducted at least once in each of a plurality of 5 mile intervals of said traverse to detect naturally occurring variations in the amount of gamma radiation sources present in the atmosphere, and correcting the detected energy spectrum of gamma radiation from the surface of the earth in order to reduce the effect of the $Bi^{214}$ present in the atmosphere.

4. The method of claim 3 and further comprising:

multiplexing the detected energy ospectrum of gamma radiation with the measured gamma radiation from the atmosphere for storage on a single channel magnetic recording medium.

5. The method of claim 3 wherein the energy spectrum of gamma radiation from the surface of the earth is detected by a plurality of parallel gamma ray detectors transported along said travel path.

6. In a system for eliminating the effects of airborne radiation on aerial radioactivity surveying for mineral deposits, the improvement comprising:

airborne means including a plurality of gamma radiation detectors for detecting the energy spectrum of gamma radiation from the surface of the earth and from sources in the atmosphere, means included with said airborne means for exclusively detecting the amount of $Bi^{214}$ in the atmosphere at least once during each of a plurality of 5 mile intervals to define naturally occurring variations in said amount, whereby the effects of the detected amount of airborne $Bi^{214}$ may be eliminated from the detected energy spectrum of gamma radiation.

7. The system of claim 6 wherein said gamma radiation detectors comprise:

thallium-activated sodium iodide crystals.

8. The system of claim 6 wherein said gamma radiation detectors comprise:

six thallium-activated sodium iodide crystals connected in parallel.

9. The system of claim 6 wherein said means for exclusively detecting comprises:
gamma ray detector means mounted in an aircraft with structure provided to exclude gamma radiation emanating from the surface of the earth.

10. The system of claim 9 wherein said structure comprises:
gamma radiation shielding means placed between said detector means and the surface of the earth.

11. The system of claim 9 wherein said detector means comprises:
thallium-activated sodium iodide crystals.

12. The system of claim 9 and further comprising:
means for multiplexing the outputs of each of said means for detecting for recording on a single channel recording medium.

* * * * *